(12) United States Patent
Shupe et al.

(10) Patent No.: US 11,518,362 B1
(45) Date of Patent: Dec. 6, 2022

(54) AXLE TORQUE RESPONSE SYSTEM AND METHOD

(71) Applicant: GM GLOBAL TECHNOLOGY OPERATIONS LLC, Detroit, MI (US)

(72) Inventors: Todd R. Shupe, Milford, MI (US); Alexandre O. Korobkine, Livonia, MI (US); Daniel Lee Baibak, White Lake, MI (US); Steven G. Dickson, White Lake, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/401,571

(22) Filed: Aug. 13, 2021

(51) Int. Cl.
| | | |
|---|---|---|
| *G06F 19/00* | (2018.01) | |
| *B60W 20/11* | (2016.01) | |
| *B60W 10/06* | (2006.01) | |
| *B60W 10/08* | (2006.01) | |
| *B60W 50/00* | (2006.01) | |

(52) U.S. Cl.
CPC ............ *B60W 20/11* (2016.01); *B60W 10/06* (2013.01); *B60W 10/08* (2013.01); *B60W 2050/0026* (2013.01); *B60W 2510/0657* (2013.01); *B60W 2510/083* (2013.01); *B60W 2540/10* (2013.01); *B60W 2720/30* (2013.01)

(58) Field of Classification Search
CPC ...... B60W 10/06; B60W 20/00; B60W 20/10; F02D 19/025; F02D 19/0623; F02P 5/04; F02P 5/145; F02P 5/15; F02P 5/152; F02P 5/16
See application file for complete search history.

(56) References Cited

U.S. PATENT DOCUMENTS

2016/0221446 A1* 8/2016 Suzuki .................... B60L 58/20
2017/0001646 A1* 1/2017 Cooke ................... B60W 10/20

* cited by examiner

Primary Examiner — John Kwon
(74) Attorney, Agent, or Firm — Cantor Colburn LLP (57) ABSTRACT

A powertrain system is controlled to deliver axle torque in response to an operator accelerator pedal input. Axle torque is determined by metrics including historical control information, current control information, and future control information.

20 Claims, 4 Drawing Sheets

| BDi Nm | -20000 | -1000 | -400 | -200 | -100 | -50 | -25 | -10 | 0 | 10 | 25 | 50 | 100 | 200 | 400 | 1000 | 20000 |
|---|---|---|---|---|---|---|---|---|---|---|---|---|---|---|---|---|---|
| K2 Nm | 2000 | 600 | 300 | 175 | 100 | 50 | 25 | 10 | 10 | 10 | 25 | 50 | 75 | 150 | 250 | 400 | 500 |

FIG. 5

AXLE TORQUE RESPONSE SYSTEM AND METHOD

INTRODUCTION

The statements in this section merely provide background information related to the present disclosure. Accordingly, such statements are not intended to constitute an admission of prior art.

Vehicles employ a variety of propulsion systems in numerous configurations that generate and transfer tractive power to a driveline in response to an operator request. Accelerator pedal position and changes in position are monitored and processed to provide torque requests that are honored by the powertrain system. Accelerator pedal position changes roughly correspond to the operator's desired change in acceleration and thus axle torque requirements. However, accelerator pedal busyness is challenging to properly interpret and may result in undesirable drivability effects particularly in systems capable of effecting large torque changes very rapidly (e.g., electric, hybrid electric, large diesel internal combustion, supercharged gasoline internal combustion, etc.). Interpreting changes in accelerator pedal position to accurately reflect the true intent of the operator is a laborious task performed during vehicle development through iterative in-vehicle calibration sessions.

SUMMARY

In one exemplary embodiment, a method for powertrain control may include comparing a torque request from an operator to a powertrain torque control, and while the torque request and the torque control signal deviate greater than a predetermined amount, latching a first reference torque to a first predetermined value. Axle torque may be controlled based upon a difference between the torque request and the first reference torque.

In addition to one or more of the features described herein, controlling powertrain torque based upon the difference between the torque request and the first reference torque may include establishing a threshold based upon the difference between the torque request and the first reference torque, latching a second reference torque to a second predetermined value while the torque request and the torque control signal deviate greater than the threshold, and controlling the axle torque based upon a difference between the torque request and the second reference torque.

In addition to one or more of the features described herein, controlling the axle torque based upon the difference between the torque request and the first reference torque may include referencing a calibration library relating changes in torque to rates of change in torque.

In addition to one or more of the features described herein, controlling the axle torque based upon the difference between the torque request and the second reference torque may include referencing a calibration library with the difference between the torque request and the second reference torque, the calibration library relating changes in torque to rates of change in torque.

In addition to one or more of the features described herein, the calibration library may be delimited by a driving mode.

In addition to one or more of the features described herein, the method may further include tracking the first reference torque to the axle torque while the torque request and the torque control signal do not deviate greater than the predetermined amount.

In addition to one or more of the features described herein, the method may further include tracking the second reference torque to the axle torque while the torque request and the torque control signal do not deviate greater than the threshold.

In addition to one or more of the features described herein, the method may further include delaying the controlling the powertrain torque based upon the difference between the torque request and the second reference torque during an axle torque intervention, and subsequent to the axle torque intervention, initiating the controlling the powertrain torque based upon the difference between the torque request and the second reference torque at an initial axle torque corresponding to a terminal axle torque at completion of the intervention.

In addition to one or more of the features described herein, the first predetermined value may include an axle torque value present when the torque request and the torque control signal initially deviate greater than the predetermined amount.

In addition to one or more of the features described herein, the second predetermined value may include an axle torque value present when the torque request and the torque control signal initially deviate greater than the threshold.

In another exemplary embodiment, a vehicle may include comprising a powertrain system having at least one actuator for controlling an axle torque, and a control system having a control module including an instruction set executable to compare a torque request from an operator to a powertrain torque control signal, latch a first reference torque to a first predetermined value while the torque request and the torque control signal deviate greater than a predetermined amount, the first predetermined value corresponding to an axle torque value present when the torque request and the torque control signal initially deviate greater than a predetermined amount, establish a threshold based upon the difference between the torque request and the first reference torque, latch a second reference torque to a second predetermined value while the torque request and the torque control signal deviate greater than the threshold, the second predetermined value corresponding to an axle torque value present when the torque request and the torque control signal initially deviate greater than the threshold, and control the at least one actuator based upon a difference between the torque request and the second reference torque.

In addition to one or more of the features described herein, the control of the at least one actuator based upon the difference between the torque request and the second reference torque may include reference of a calibration library with the difference between the torque request and the second reference torque, the calibration library relating changes in torque to rates of change in torque.

In addition to one or more of the features described herein, the calibration library may be delimited by a driving mode.

In addition to one or more of the features described herein, the instruction set may be further executable to track the first reference torque to the axle torque while the torque request and the torque control signal do not deviate greater than the predetermined amount.

In addition to one or more of the features described herein, the instruction set may be further executable to track the second reference torque to the axle torque while the torque request and the torque control signal do not deviate greater than the threshold.

In addition to one or more of the features described herein, the instruction set may be further executable to delay control of the at least one actuator based upon the difference between the torque request and the second reference torque during an axle torque intervention, and subsequent to the axle torque intervention, initiate the control of the at least one actuator based upon the difference between the torque request and the second reference torque at an initial axle torque value corresponding to a terminal axle torque value at completion of the intervention.

In yet another exemplary embodiment, a method for powertrain control may include receiving, at a control module, accelerator pedal position from an accelerator pedal and vehicle speed information, calculating, at the control module, a driver torque target based upon the accelerator pedal position and the vehicle speed, calculating, at the control module, a deviation between the driver torque target and a shaped torque request, comparing, at the control module, the deviation to a first calibration threshold, latching, at the control module, a basic reference torque to a first predetermined value while the deviation exceeds the first calibration threshold, the first predetermined value corresponding to the shaped torque request when the deviation initially exceeds the first calibration threshold, tracking, at the control module, the basic reference torque to the shaped torque request while the deviation does not exceed the first calibration threshold, calculating, at the control module, a basic driver intent as the difference between the driver torque target and the basic reference torque, referencing, at the control module, a second calibration threshold as a function of the basic driver intent, comparing, at the control module, the deviation to the second calibration threshold, latching, at the control module, a true reference torque to a second predetermined value while the deviation exceeds the second calibration threshold, the second predetermined value corresponding to the shaped torque request when the deviation initially exceeds the second calibration threshold, tracking, at the control module, the true reference torque to the shaped torque request while the deviation does not exceed the second calibration threshold, calculating, at the control module, a true driver intent as the difference between the driver torque target and the true reference torque, referencing, at the control module, a library of calibration tables with the true driver intent and returning a torque acceleration request, the library of calibration tables relating changes in torque to rates of change in torque, determining, at the control module, the shaped torque request based upon the driver torque target limited by the torque acceleration request, and controlling, by the control module, at least one actuator for controlling an axle torque based upon the shaped torque request.

In addition to one or more of the features described herein, the library of calibration tables may be delimited by a driving mode.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

Figure 1:
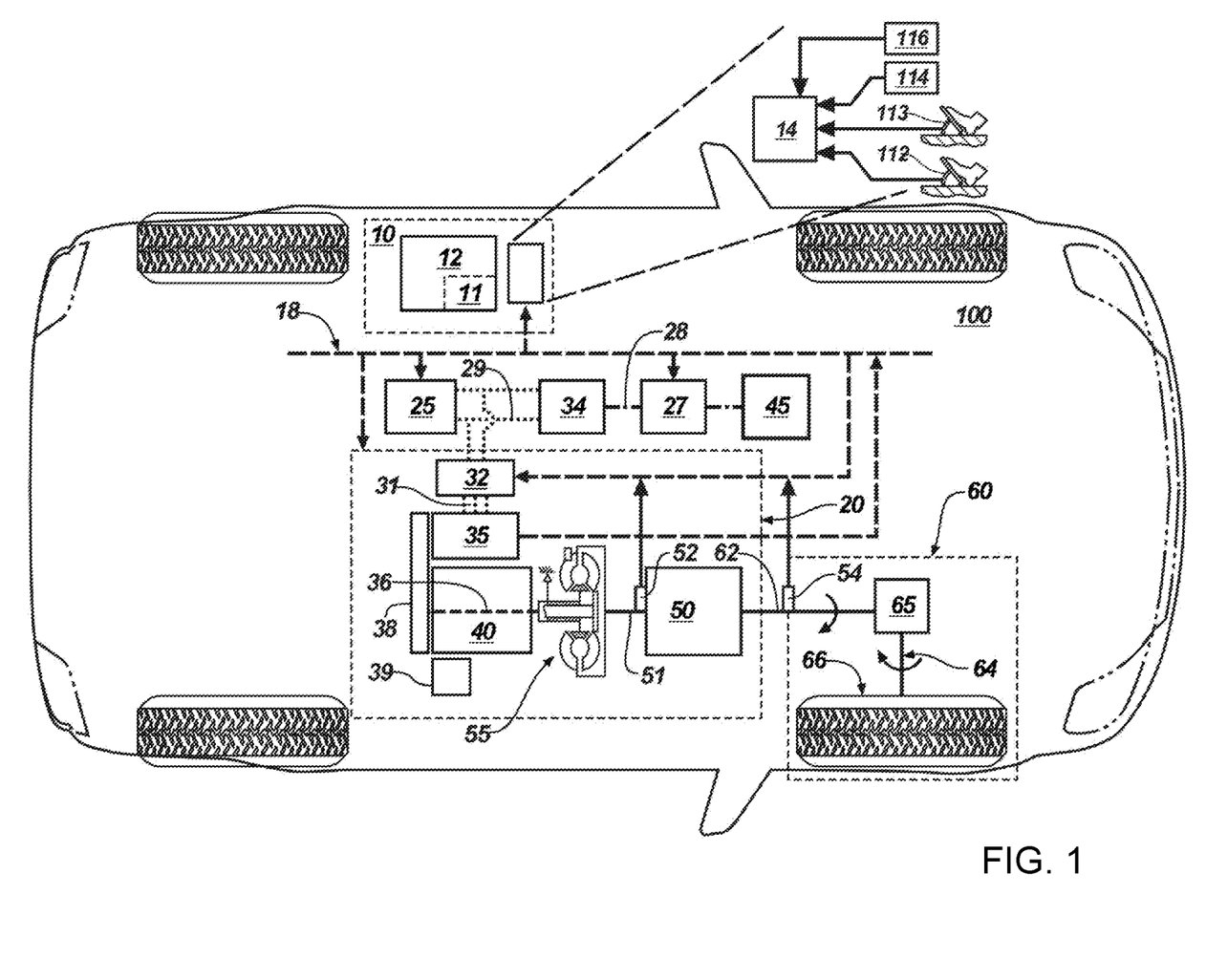
FIG. 1 illustrates an exemplary powertrain system, in accordance with the present disclosure.

Referring now to the drawings, wherein the showings are for the purpose of illustrating certain exemplary embodiments only and not for the purpose of limiting the same, FIG. 1 schematically shows a vehicle 100 including an exemplary hybrid powertrain system 20 coupled to a driveline 60 and controlled by a control system 10. Like numerals refer to like elements throughout the description. The powertrain system 20 includes torque-generative devices including an internal combustion engine 40 and a non-combustion torque machine 35 that are capable of generating and reacting torque that is transferred to the driveline 60 via a transmission 50. One configuration of the powertrain system 20 may include the torque machine 35 rotatably mechanically coupled to a crankshaft 36 of the engine 40. The crankshaft may rotatably mechanically couple through a fluidic torque coupling device (torque converter) 55 to an input member 51 of a multi-ratio transmission 50. The crankshaft 36 may mechanically rotatably couple to the torque machine 35 via a gearbox mechanism 38. Other configurations of the powertrain system 20 that include the torque machine 35 rotatably mechanically coupled to the engine 40 that mechanically couples to the transmission 50 may be employed within the scope of this disclosure. Hybrid and non-hybrid powertrains may be employed in other embodiments including, for example, internal combustion powertrains, electric powertrains, and hybrid powertrains of any topology (e.g., series, parallel, series/parallel, mild, full, plug-in, BAS, multi-mode, etc.).

The engine 40 is preferably a multi-cylinder internal combustion engine that converts fuel to mechanical torque through a thermodynamic combustion process. The engine 40 is equipped with a plurality of actuators and sensing devices for monitoring operation and delivering fuel to form a combustion charge to produce torque that is responsive to an operator request for vehicle propulsion. The engine actuators include slow actuators and fast actuators. A fast engine actuator is an actuator that completes a change in engine operation, e.g., engine torque output that is responsive to a change in a command to the engine actuator within a single engine cylinder event. One example of a fast engine actuator is spark ignition timing. A slow engine actuator is an actuator that completes a change in engine operation, e.g., engine torque output that responsive to a change in a command to the engine actuator only after a delay of more than a single engine cylinder event. One example of a slow engine actuator is electronic throttle control (ETC). The engine may take 100 to 500 ms to effect a change in engine torque output in response to a change in the ETC due to latencies associated with intake manifold fill times and other factors. The engine 40 is configured to execute autostart and autostop control schemes and fuel cutoff (FCO) control schemes during ongoing operation of the powertrain system 20. The engine 40 is considered to be in an OFF state when it is not rotating. The engine 40 is considered to be in an ON state when it is rotating, including one or more FCO states in which it is spinning and unfueled.

The non-combustion torque machine 35 is an electrically-powered torque machine 35 that includes a high-voltage, multi-phase electric machine (i.e., motor/generator) electrically connected to an inverter module 32. The torque machine 35 includes a rotor and a stator and an accompanying position sensor. The torque machine 35 in concert with the inverter module 32 is operable to convert stored electric energy to mechanical power and convert mechanical power to electric energy. The inverter module 32 includes fast actuators, which are able to complete a change in operation of the torque machine 35, e.g., torque output or speed output that is responsive to a change in a command to the engine actuator within an amount of time corresponding to a single engine cylinder event, i.e., within 10-20 msec. Generally, response time of an electrically-powered torque machine 35 is multiple times faster than that of an internal combustion engine. One example of a fast actuator for the torque machine is a power transistor. The inverter module 32 acts as a fast actuator to control the torque machine 35. The electric energy may be consumed or stored in a high-voltage battery 25 in one embodiment.

In one embodiment, the electrically-powered torque machine 35 includes an output member that mechanically rotatably couples to the crankshaft 36 of the engine 40 via the gearbox mechanism 38, which provides a mechanical power path therebetween. The gearbox mechanism 38 may be configured to effect torque transfer between the engine 40 and the torque machine 35, including torque transfer from the torque machine 35 to the engine 40 for engine autostart and autostop operation, tractive torque assistance, torque transfer for regenerative vehicle braking, and torque transfer from engine 40 to the torque machine 35 for high-voltage electrical charging. In one embodiment, the gearbox mechanism 38 may include a planetary gearset. The engine 40 may include a low-voltage solenoid-actuated electrical starter 39 for engine starting in response to a key-crank event in one embodiment.

The high-voltage battery 25 electrically connects to the inverter module 32 via a high-voltage DC bus 29 to transfer high-voltage DC electric power to the torque machine 35 in response to control signals originating in the control system 10. The inverter module 32 electrically connects to the torque machine 35 via a multi-phase motor control power bus 31. The inverter module 32 is configured with suitable control circuits including the power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control to convert stored DC electric power originating in the high-voltage battery 25 to AC electric power to drive the torque machine 35 to generate torque in response to motor torque commands. Similarly, the inverter module 32 converts mechanical power transferred to the torque machine 35 to DC electric power to generate electric energy that is storable in the high-voltage battery 25 in response to motor control commands, including as part of a regenerative control strategy. The inverter module 32 is configured to control the power transistors to provide the motor drive and regeneration functionality in response to the motor control commands. In one embodiment, a DC/DC electric power converter 34 electrically connects to a low-voltage bus 28 and a low-voltage battery 27, and electrically connects to the high-voltage bus 29. Such electric power connections are known and not described in detail. The low-voltage battery 27 electrically connects to an auxiliary power system 45 to provide low-voltage electric power to low-voltage systems on the vehicle, including, e.g., electric windows, HVAC fans, seats, and the low-voltage solenoid-actuated electrical starter 39.

The transmission 50 is configured to operate in one of a plurality of selectable fixed-gear operating modes to operate at a gear ratio that achieves a preferred match between the operator request for propulsion and an engine operating point, and preferably employs one or a plurality of differential gear sets and hydraulically-activated clutches to effect torque transfer in one of a plurality of selectable operating modes over a range of speed ratios between the input member 51 and output member 62. Exemplary transmissions include, by way of example, an automatic transmission, a dual clutch transmission, a clutchless manual transmission and a manual transmission. The transmission 50 executes upshifts to shift to an operating mode having a lower numerical multiplication ratio (gear ratio) and executes downshifts to shift to an operating mode having a higher numerical multiplication ratio in response to output torque requests. A transmission upshift requires a reduction in engine speed so the engine speed matches transmission output speed multiplied by the gear ratio at a gear ratio associated with the target operating mode. A transmission downshift requires an increase in engine speed so the engine speed matches transmission output speed multiplied by the gear ratio at a gear ratio associated with the target operating mode. Alternatively, the transmission 50 may be configured as a continuously variable transmission. The transmission preferably includes a first rotational position/speed sensor 52 to monitor rotation of the input member 51 and a second rotational position/speed sensor 54 to monitor rotation of the output member 62 of the transmission 50. Vehicle speed is readily determined from the second rotational position/speed sensor 54 and a final drive (e.g., 65, 66) ratio. The powertrain system 20 may include a torque converter 55 between the engine 40 and the transmission 50.

The driveline 60 may include a differential gear device 65 that mechanically couples to an axle 64, transaxle or half-shaft that mechanically couples to a wheel 66 in one embodiment. The driveline 60 transfers tractive power between the transmission 50 and a road surface.

The control system 10 may include a control module 12 that signally connects to an operator interface 14. The control module 12 preferably includes a plurality of discrete devices that are co-located with the individual elements of the powertrain system 20 to effect operational control of the individual elements of the powertrain system 20. The control module 12 may also include a control device that provides hierarchical control of other control devices. The control module 12 signally and operatively connects to each of the high-voltage battery 25, the inverter module 32, the torque machine 35, the engine 40, and the transmission 50 either directly or via a communications bus 18 to monitor operation and determine parametric states thereof. The operator interface 14 of the vehicle 100 is a controller that signally connects to a plurality of human/machine interface devices through which a vehicle operator inputs various operator requests for propulsion or tractive power and other requests for operation of the vehicle 100. The human/machine interface devices are devices that monitor and evaluate the operator requests for tractive power including, e.g., an accelerator pedal 112, which provides an operator accelerator pedal position (APP); a brake pedal 113, which provides an operator brake pedal position (BPP); a transmission range selector 114, which provides an operator requested transmission range signal (PRNDL); and a vehicle speed cruise control system 116, which provides an operator request for vehicle speed (CRUISE). Other human/machine interface devices preferably include an ignition switch to enable an operator to initiate vehicle operation, including cranking and starting the engine 40, a steering wheel, and a headlamp switch. The human/machine interface devices set forth are exemplary and non-limiting. It is also understood that not all vehicles may include many of the human/machine interface devices. For example, autonomous and semi-autonomous vehicles may have fewer or different human/machine interface devices. The transmission range selector 114 provides signal input indicating direction of operator-requested motion of the vehicle including a discrete number of operator-selectable positions indicating the preferred rotational direction of the output member 62 of either a forward or a reverse direction or a neutral state. It is appreciated that the vehicle may still move in a direction other than the indicated direction of operator-requested motion due to rollback caused by location of a vehicle, e.g., on a hill.

The powertrain system 20 includes a communications scheme including the communications bus 18 to effect communications in the form of sensor signals and actuator command signals between the control system 10 and elements of the powertrain system 20. The communications scheme employs one or more communications systems and devices, including, e.g., the communications bus 18, a direct connection, a local area network bus, a serial peripheral interface bus, and wireless communications to effect information transfer.

Throughout the drawings, corresponding reference numerals indicate like or corresponding parts and features. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests.

Figure 2:
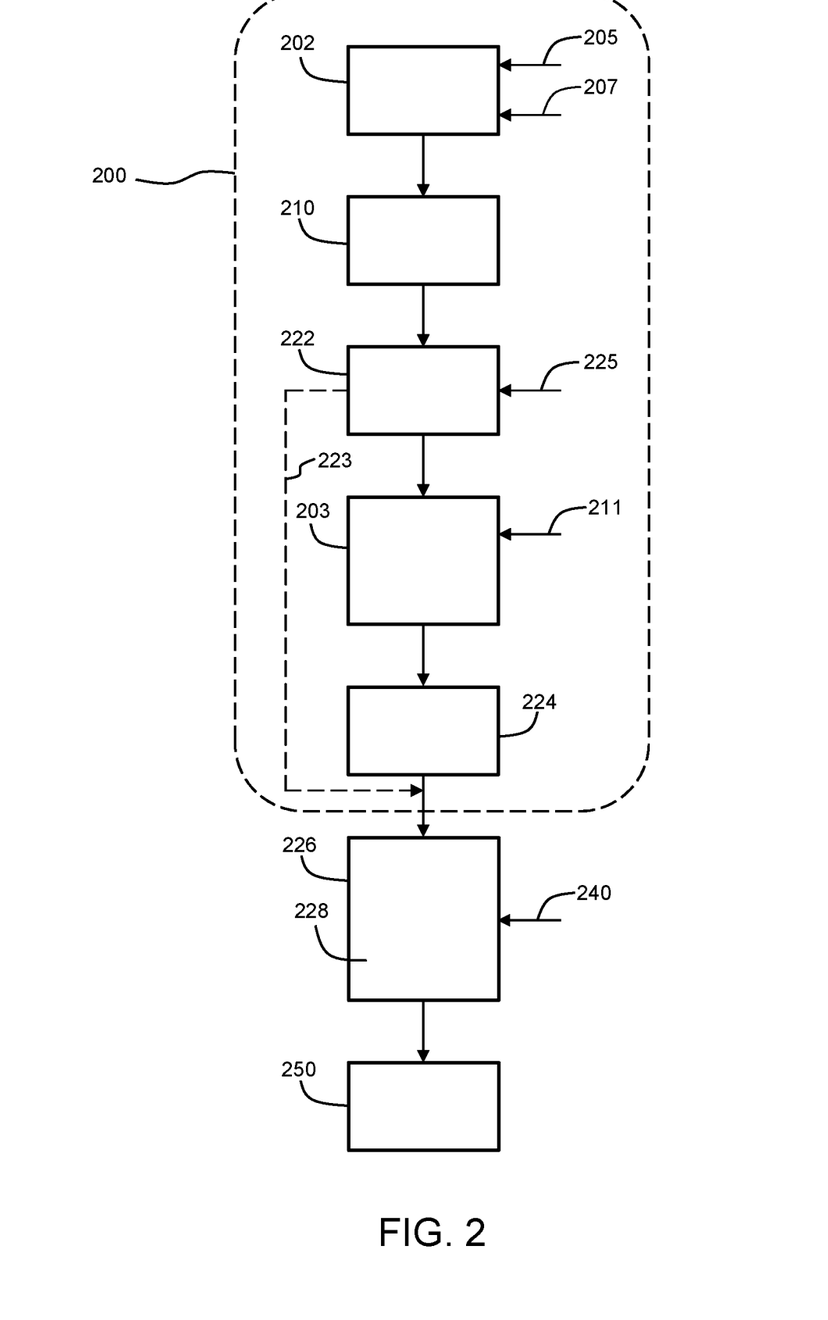
FIG. 2 illustrates a functional block diagram of certain aspects of an exemplary control system, in accordance with the present disclosure.

FIG. 2 illustrates a functional block diagram of certain aspects of an exemplary control system 10. An exemplary implementation of the control module 12 includes a driver axle torque module 200. The driver axle torque module 200 may determine a final driver axle request as discussed below.

The driver axle torque module 200 may include a pedal request module 202, a conversion module 210, a torque request arbitration module 222, a torque acceleration request module (TARM) 203, and a torque shaping module 224. The pedal request module 202 determines a pedal torque request (PTR). The pedal torque request may be in terms of a propulsion torque domain (i.e., torque at the crankshaft or other input to the driveline). The pedal request module 202 may determine the pedal torque request based upon accelerator pedal position APP 205 and vehicle speed information 207 among other suitable parameters as known to those skilled in the art.

The conversion module 210 receives the pedal torque request and converts the pedal torque request into the axle torque domain (i.e., torque at the wheels or axles). After being converted into the axle torque domain, the request may be referred to as a driver torque request. The conversion module 210 may convert the pedal torque request based on, for example, drivetrain losses, the gear ratio selected within the transmission, one or more torque ratios, and other suitable parameters.

The arbitration module 222 may receive the driver torque request and other torque requests 225 and arbitrate between the received requests. For example only, the arbitration module 222 may arbitrate between torque requests related to longitudinal propulsion, such as driver torque requests and cruise torque requests. The arbitration module 222 outputs a winner of such arbitrations. In one embodiment, arbitration between longitudinal propulsion torque requests and other torque requests not primarily for longitudinal propulsion purposes, for example from chassis control interventions such as stability controls, may result in bypass of the torque acceleration request module 203 at 223 for torque scheduling in accordance with alternative controls and calibrations. In other embodiments, arbitrations between longitudinal propulsion torque requests and other torque requests not primarily for longitudinal propulsion purposes may be accomplished in other modules. The output of the arbitration module is the winner of the arbitration and represents a raw axle torque request (e.g., Nm) and may be referred to as the driver torque target (DTT). The raw axle torque request is in terms of the axle torque domain (i.e., torque at the wheels or axles). The driver torque target DTT may be operated upon by the torque acceleration request module (TARM) 203 as further described herein.

The torque acceleration request module (TARM) 203 may receive the raw axle torque request in the driver torque target DTT from arbitration module 222. Torque acceleration request module 203 may employ one or more calibration tables or maps relating axle torque requests to torque rate limits for shaping the raw axle torque requests into a shaped torque request (STR) as described in further detail herein. More particularly, the calibration tables may relate a desired change in axle torque to a desired rate of axle torque change for achieving vehicle acceleration response in accordance with a desired acceleration response. It is appreciated that the calibrations and discussion herein are in the torque domain and more particularly in the axle torque domain; however, vehicle performance/drivability development may initially occur in an acceleration domain later converted for controls application into an axle torque domain, it being understood that one having ordinary skill in the art understands the relationships between vehicle acceleration and axle torque. Calibration table as used herein may refer to calibration elements, calibration arrays, calibration tables or combinations and libraries thereof. A calibration table as described may be adapted for varying driving styles or conditions (driving modes), for example, tour, sport, snow, closed track, four wheel drive low or high, etc. As such, a multi-dimensional library of such calibration tables may be delimited by a driving mode dimension and accessed in accordance therewith. The torque acceleration request module (TARM) 203 therefore may include an additional input at 211, for example through a user interface selection, to selectively employ a table corresponding to the driving mode selected. The torque acceleration request module (TARM) 203 may shape the torque acceleration request, for example in accordance with calibration table rate limits and one or more filters, to reduce or prevent a "jumpy" or "jerky" feel that may be experienced when the driver exhibits accelerator pedal busyness or dithering. Generally, torque shaping is implemented to improve drivability and provide for a pleasing, smooth and responsive driver experience without being perceptibly constrained. The torque acceleration request module (TARM) 203 may provide the shaped torque request (STR) to shaping module 224 for additional torque shaping as described in further detail herein.

The shaping module 224 may receive the shaped torque request (STR) and provide additional torque shaping. For example only, in powertrains capable of distributing total axle torque among different axles or to individual vehicle corners, the shaping module 224 may further adapt the shaped torque request (STR) for such distribution. The shaped torque request STR is in terms of the axle torque domain (i.e., torque at the wheels or axles). The shaped torque request STR is passed to the torque delivery module 226 and represents the current delivered or controlled axle torque.

The torque delivery module 226 receives the shaped torque request STR from the shaping module 224. The torque delivery module 226 determines a final driver axle request and may include an axle torque arbitration module 228 for arbitration with other axle torque requests. The axle torque arbitration module 228 arbitrates between the shaped torque request STR from the shaping module 224 and other axle torque requests and axle torque interventions 240. In one embodiment, axle torque interventions may be accommodated by holding execution of the shaped torque request STR in abeyance or delayed such that upon termination of any such intervention the shaped torque request STR is initiated at an axle torque corresponding to the axle torque at the termination of the axle torque intervention. The axle torque interventions may come from driveline dynamics management (DDM) primarily imposed for so-called clunk zone or lash zone management to mitigate undesirable driveline gear mesh disturbances (i.e., operator discernable noise and bump) during torque reversals or applications from quiescent states, for example. Other axle torque interventions may also include a torque reduction requested by a traction control system when positive wheel slip is detected. Positive wheel slip may occur when axle torque (i.e., torque to the wheels) overcomes friction between the wheels and the road surface, and the wheels slip with respect to the road surface in a forward direction. The other axle torque interventions may also include a torque increase request to counteract negative wheel slip, where a tire of the vehicle slips or drags with respect to the road surface in a reverse direction because the axle torque is negative. Other axle torque interventions may also include various brake management requests and other axle torque effecting controls of the powertrain related, for example, to vehicle stability and tracking management, collision avoidance, incipient collision mitigation and preparations, etc. These exemplary other axle torque requests and interventions are merely disclosed by way of non-limiting examples. Therefore, the torque delivery module 226 may generally set the final driver axle request (e.g., Nm) equal to the shaped torque request STR unless a higher priority other axle torque request or intervention is required. The final driver axle request is passed to the actuation module 250.

The actuation module 250 receives the final driver axle request from the torque delivery module 226. The actuation module 250 determines how the final driver axle request will be achieved. The actuation module 250 may be powertrain specific. For example only, the actuation module 250 may be implemented differently or use different control schemes for spark-ignition engines versus compression-ignition engines, and for electric machines in hybrid and full electric powertrains. For example only, in a spark-ignition engine, the actuation module 250 may vary the opening of a throttle valve as a slow actuator that allows for a wide range of torque control. The actuation module 250 may disable cylinders using a cylinder actuator module, which also provides for a wide range of torque control, but may also be slow and may involve drivability and emissions concerns. The actuation module 250 may use spark timing as a fast actuator. However, spark timing may not provide as much range of torque control. In addition, the amount of torque control possible with changes in spark timing (referred to as spark reserve capacity) may vary as air flow changes. Full electric vehicles would require the actuation module to regulate motor torque(s) primarily through inverter control which can vary torque rapidly and predictably. In various implementations, such as the hybrid embodiment of FIG. 1, the actuation module 250 may employ various controls of engine actuators and electric machine actuators (e.g., inverters) to effect axle torque control.

Figure 3:
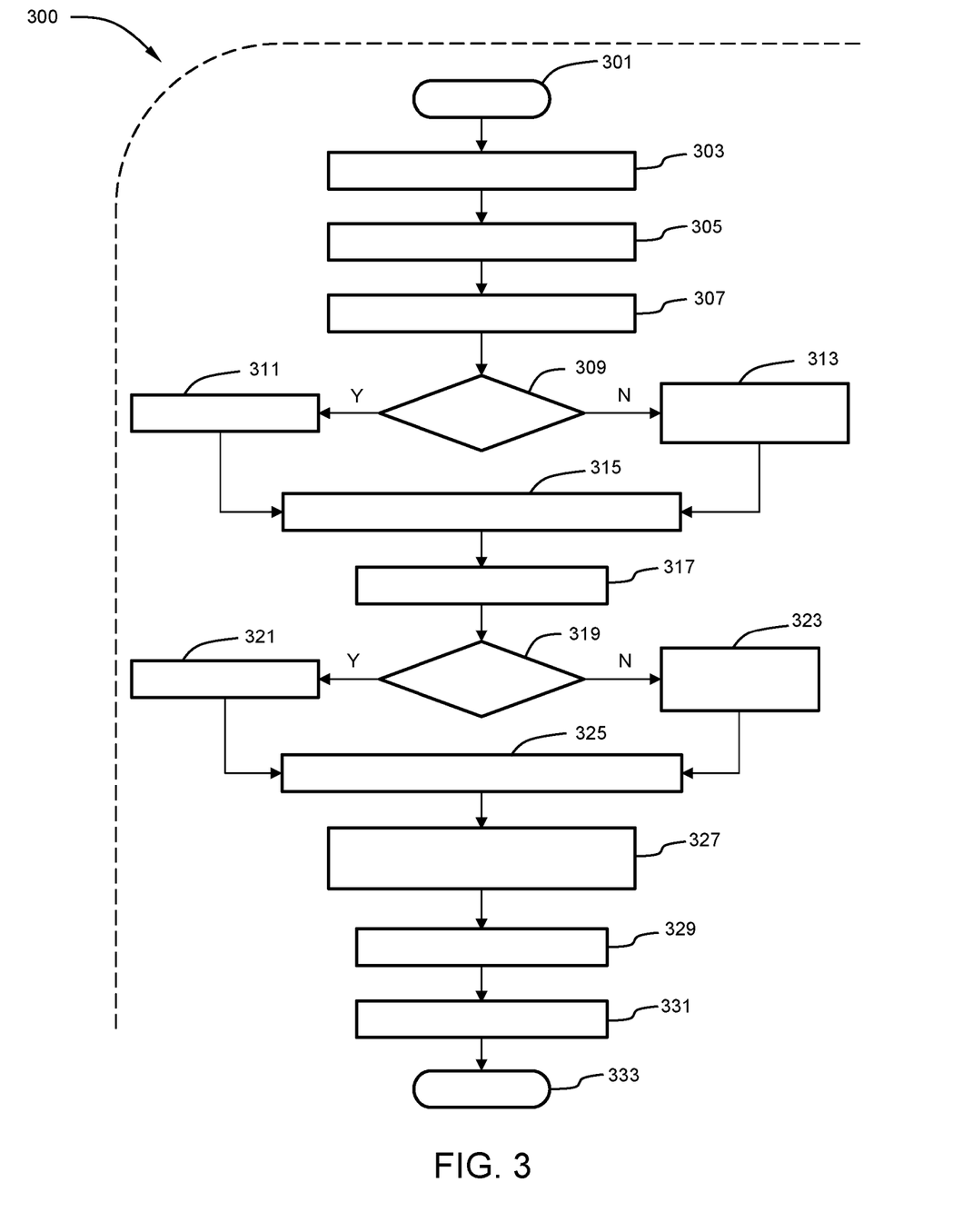
FIG. 3 illustrates a process flow routine of an exemplary powertrain control, in accordance with the present disclosure.

FIG. 3 illustrates a process flow routine (routine) 300 of an exemplary implementation of torque acceleration request module (TARM) 203 (FIG. 2) and control of the powertrain system 20 (FIG. 1). The various steps shown in the routine 300 may be embodied in executable code within control module 12 of FIG. 1. During ongoing vehicle operation, routine 300 is repetitively executed as part of an overall powertrain system 20 control. The steps illustrated may be executed in the order and manner illustrated or may be executed in alternative orders or simultaneously, the routine 300 being exemplary. The routine 300 is entered at 301 and includes receipt of various input information at 303 necessary for the operations to follow, for example, accelerator pedal position APP 205 and vehicle speed information 207 (FIG. 2), and control parameters such as the shaped torque request STR of the present routine 300. The driver torque target DTT is next calculated at 305 and may include conversions of pedal torque requests into the axle torque domain and arbitrations of the pedal torque request and other torque requests to arrive at the driver torque target DTT. The magnitude of the deviation of the driver torque target DTT from the shaped torque request STR is next calculated at 307. The shaped torque request STR as previously mentioned may be expected to dampen high rates of change in accordance with certain time constant constraints yet generally converge its output (STR) to the input (DTT). Thus, deviations between the shaped torque request STR and the driver torque target DTT may be expected at higher change rates of the driver torque target DTT and may remain until the shaped torque request STR and the driver torque target DTT converge.

At 309, the deviation is compared to a first calibration threshold K1 which represents a predetermined minimum torque change threshold sufficient to latch an historical record of the current delivered axle torque at or about the occurrence of the minimum torque change threshold. In one embodiment, the calibration threshold K1 may be an element. In other embodiments, the calibration threshold may be vector or table derived. The shaped torque request STR is representative of the current delivered axle torque. Thus, when the deviation exceeds the calibration threshold K1, a basic reference torque (BRT) may be latched to the value of the shaped torque request STR corresponding to the time of deviation at 311. In other embodiments, the latched value may vary from the shaped torque request, for example by some constant offset. The basic reference torque BRT remains latched to this value for so long as the deviation exceeds the calibration threshold K1. When the deviation no longer exceeds the calibration threshold K1, or for so long as the deviation does not exceed the calibration threshold K1, the basic reference torque BRT tracks the shaped torque request STR at 313. A basic driver intent BDI is calculated as the difference between the driver torque target DTT and the basic reference torque BRT at 315. It is appreciated that while the basic reference torque BRT remains latched, the basic driver intent BDI retains a metric of operational history in the latched value of the shaped torque request STR from the most recent deviation of the driver torque target DTT from the shaped torque request STR in excess of the calibration threshold K1. Thus, it is appreciated that the basic driver intent BDI provides a metric relative to a temporal historical accounting of operation and represents a basic change in acceleration desired. The basic driver intent BDI therefore provides a metric including historical control information (e.g., the latched basic reference torque BRT), current control information (e.g., the shaped torque request STR), and future control information (e.g., the driver torque target DTT).

Figure 4:
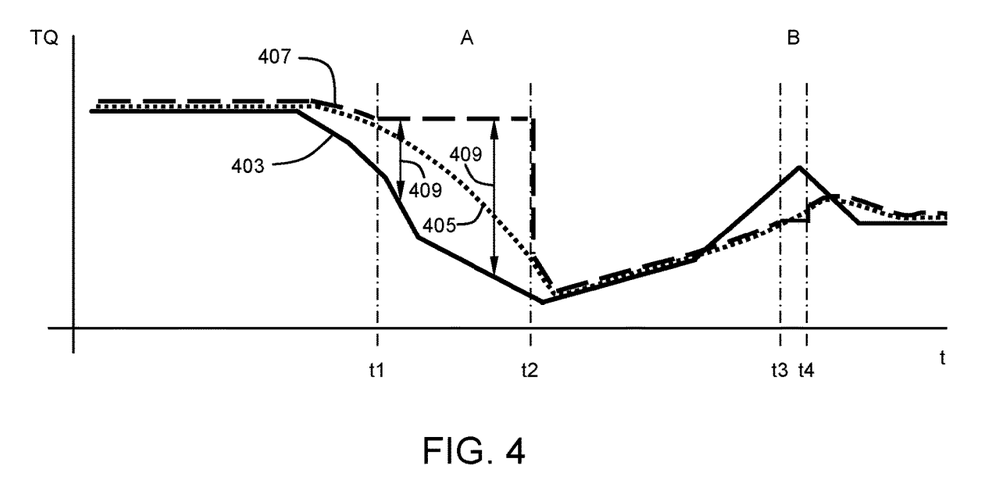
FIG. 4 illustrates exemplary metrics in a determination of basic driver intent, in accordance with the present disclosure.

FIG. 4 illustrates two exemplary sequences of the basic reference torque BRT latch and release; one sequence "A" being with respect to a throttle pedal tip-out, and another sequence "B" being with respect to a throttle pedal tip-in. In FIG. 4, torque (TQ) is along the vertical axis and time (t) is along the horizontal axis. The driver torque target DTT is the solid line labeled 403, the shaped torque request STR is the dotted line labeled 405, the basic reference torque BRT is the dashed line labeled 407, and the basic driver intent BDI is represented as the double ended arrows labeled 409. Prior to time t1 the shaped torque request STR and basic reference torque BRT are tracking closely as the driver torque target DTT and the shaped torque request STR do not deviate in excess of the calibration threshold K1, even as a tip-out begins as shown by the driver torque target DTT decreasing. At time t1 the driver torque target DTT and the shaped torque request STR deviate in excess of the calibration threshold K1 and the basic reference torque BRT is latched at the then current shaped torque request STR. The basic reference torque BRT remains latched between times t1 and t2. At time t2 the driver torque target DTT and the shaped torque request STR no longer deviate in excess of the calibration threshold K1 and the basic reference torque BRT is unlatched and once again tracks the shaped torque request STR. After time t2, a moderate tip-in begins as shown by the driver torque target DTT increasing. The shaped torque request STR and basic reference torque BRT are tracking closely as the driver torque target DTT and the shaped torque request STR do not deviate in excess of the calibration threshold K1. At time t3, the driver torque target DTT and the shaped torque request STR deviate in excess of the calibration threshold K1 and the basic reference torque BRT is latched at the then current shaped torque request STR. The basic reference torque BRT remains latched between times t3 and t4. At time t4 the driver torque target DTT and the shaped torque request STR no longer deviate in excess of the calibration threshold K1 and the basic reference torque BRT is unlatched and once again tracks the shaped torque request STR.

Figure 5:
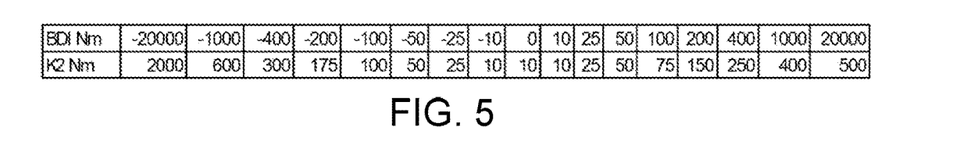
FIG. 5 illustrates an exemplary calibration vector, in accordance with the present disclosure.

It is appreciated that the basic driver intent BDI may vary significantly as the driver torque target DTT remains dynamic and variable in accordance with accelerator pedal variation and particularly while the basic reference torque BRT remains latched and is not tracking the shaped torque request STR in its quest for convergence with the driver torque target DTT. The basic driver intent BDI is next used at 317 in referencing a second calibration threshold K2, which may be referenced from a calibration table to return for any basic driver intent BDI a respective second calibration threshold K2 which represents a predetermined minimum torque change threshold sufficient to latch an historical record of the current delivered axle torque at or about the occurrence of the minimum torque change threshold. In one embodiment, the table referenced for the second calibration threshold K2 may be a one-dimensional vector. Other embodiments may employ multi-dimensional calibration tables or calibration libraries. The shaped torque request STR is representative of the current delivered axle torque. An exemplary calibration vector is illustrated in FIG. 5. It is appreciated that as the basic driver intent BDI varies, the second calibration threshold K2 may vary. At 319, the deviation (i.e., deviation between the shaped torque request STR and the driver torque target DTT) is compared to the second calibration threshold K2. Thus, when the deviation exceeds the second calibration threshold K2, a true reference torque (TRT) may be latched to the value of the shaped torque request STR corresponding to the time of deviation at 321. In other embodiments, the latched value may vary from the shaped torque request, for example by some constant offset. The true reference torque TRT remains latched to this value for so long as the deviation exceeds the second calibration threshold K2. When the deviation no longer exceeds the second calibration threshold K2, or for so long as the deviation does not exceed the second calibration threshold K2, the true reference torque TRT tracks the shaped torque request STR at 323. A true driver intent TDI is calculated as the difference between the driver torque target DTT and the true reference torque TRT at 325. It is appreciated that while the true reference torque TRT remains latched, the true driver intent TDI retains a metric of operational history in the latched value of the shaped torque request STR from the most recent deviation of the driver torque target DTT from the shaped torque request STR in excess of the second calibration threshold K2. Thus, it is appreciated that the true driver intent TDI provides a metric relative to a temporal historical accounting of operation which varies with changes in the basic driver intent BDI and represents a true change in acceleration desired that relates to historical operation in time and torque that is increasingly closer to current operation. The true driver intent TDI therefor provides a metric including historical control information (e.g., the latched true reference torque TRT), current control information (e.g., the shaped torque request STR), and future control information (e.g., the driver torque target DTT).

At 327, a torque acceleration request TAR library is referenced to look up a torque acceleration request TAR value corresponding to the true driver intent TDI. The library may include a plurality of, for example, one dimensional tables each corresponding to a specific driving mode as previously described. In one embodiment, the torque acceleration request TAR value may represent a rate limit on changes in axle torque. It is appreciated that such control through the look ups based upon the true driver intent TDI as it varies with changes in the basic driver intent BDI may smooth the final transition phase of acceleration changes by effectively attenuating or feathering the rate of change of acceleration toward the terminal acceleration driver torque target DTT. The final shaping of the shaped torque request STR at 329 may operate to rate limit the driver torque target DTT in the course of the shaping functions and filtering at 329 which may include further adaptation of the shaped torque request as may be beneficial in distributing total axle torques among multiple axles or vehicle corners. Torque delivery and actuation functions of modules 226 and 250 of FIG. 2 are implemented in controlling the powertrain system in accordance with the shaped torque request STR at 331. The routine 300 exits at 333, for example reentering at 301 for iterative execution.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof

What is claimed is:

1. A method for powertrain control, comprising:
    comparing a torque request from an operator to a powertrain torque control signal;
    while the torque request and the torque control signal deviate greater than a predetermined amount, latching a first reference torque to a first predetermined value; and
    controlling an axle torque based upon a difference between the torque request and the first reference torque.

2. The method of claim 1, wherein controlling powertrain torque based upon the difference between the torque request and the first reference torque comprises:
    establishing a threshold based upon the difference between the torque request and the first reference torque;
    while the torque request and the torque control signal deviate greater than the threshold, latching a second reference torque to a second predetermined value; and
    controlling the axle torque based upon a difference between the torque request and the second reference torque.

3. The method of claim 1, wherein controlling the axle torque based upon the difference between the torque request and the first reference torque comprises referencing a calibration library relating changes in torque to rates of change in torque.

4. The method of claim 2, wherein controlling the axle torque based upon the difference between the torque request and the second reference torque comprises referencing a calibration library with the difference between the torque request and the second reference torque, the calibration library relating changes in torque to rates of change in torque.

5. The method of claim 3, wherein the calibration library is delimited by a driving mode.

6. The method of claim 4, wherein the calibration library is delimited by a driving mode.

7. The method of claim 1, further comprising, while the torque request and the torque control signal do not deviate greater than the predetermined amount, tracking the first reference torque to the axle torque.

8. The method of claim 2, further comprising, while the torque request and the torque control signal do not deviate greater than the predetermined amount, tracking the first reference torque to the axle torque.

9. The method of claim 2, further comprising:
    while the torque request and the torque control signal do not deviate greater than the threshold, tracking the second reference torque to the axle torque.

10. The method of claim 2, further comprising:
    delaying the controlling the powertrain torque based upon the difference between the torque request and the second reference torque during an axle torque intervention; and
    subsequent to the axle torque intervention, initiating the controlling the powertrain torque based upon the difference between the torque request and the second reference torque at an initial axle torque corresponding to a terminal axle torque at completion of the intervention.

11. The method of claim 1, wherein the first predetermined value comprises an axle torque value present when the torque request and the torque control signal initially deviate greater than the predetermined amount.

12. The method of claim 2, wherein the second predetermined value comprises an axle torque value present when the torque request and the torque control signal initially deviate greater than the threshold.

13. A vehicle, comprising:
    a powertrain system comprising at least one actuator for controlling an axle torque; and
    a control system comprising a control module including an instruction set executable to:

compare a torque request from an operator to a powertrain torque control signal;
latch a first reference torque to a first predetermined value while the torque request and the torque control signal deviate greater than a predetermined amount, the first predetermined value corresponding to an axle torque value present when the torque request and the torque control signal initially deviate greater than a predetermined amount;
establish a threshold based upon a difference between the torque request and the first reference torque;
latch a second reference torque to a second predetermined value while the torque request and the torque control signal deviate greater than the threshold, the second predetermined value corresponding to an axle torque value present when the torque request and the torque control signal initially deviate greater than the threshold; and
control the at least one actuator based upon a difference between the torque request and the second reference torque.

14. The vehicle of claim 13, wherein the control of the at least one actuator based upon the difference between the torque request and the second reference torque comprises reference of a calibration library with the difference between the torque request and the second reference torque, the calibration library relating changes in torque to rates of change in torque.

15. The vehicle of claim 14, wherein the calibration library is delimited by a driving mode.

16. The vehicle of claim 13, wherein the instruction set is further executable to track the first reference torque to the axle torque while the torque request and the torque control signal do not deviate greater than the predetermined amount.

17. The vehicle of claim 13, wherein the instruction set is further executable to track the second reference torque to the axle torque while the torque request and the torque control signal do not deviate greater than the threshold.

18. The vehicle of claim 13, wherein the instruction set is further executable to:
delay control of the at least one actuator based upon the difference between the torque request and the second reference torque during an axle torque intervention; and
subsequent to the axle torque intervention, initiate the control of the at least one actuator based upon the difference between the torque request and the second reference torque at an initial axle torque value corresponding to a terminal axle torque value at completion of the intervention.

19. A method for powertrain control, comprising:
receiving, at a control module, accelerator pedal position from an accelerator pedal and vehicle speed information;
calculating, at the control module, a driver torque target based upon the accelerator pedal position and the vehicle speed;
calculating, at the control module, a deviation between the driver torque target and a shaped torque request;
comparing, at the control module, the deviation to a first calibration threshold;
latching, at the control module, a basic reference torque to a first predetermined value while the deviation exceeds the first calibration threshold, the first predetermined value corresponding to the shaped torque request when the deviation initially exceeds the first calibration threshold;
tracking, at the control module, the basic reference torque to the shaped torque request while the deviation does not exceed the first calibration threshold;
calculating, at the control module, a basic driver intent as a difference between the driver torque target and the basic reference torque;
referencing, at the control module, a second calibration threshold as a function of the basic driver intent;
comparing, at the control module, the deviation to the second calibration threshold;
latching, at the control module, a true reference torque to a second predetermined value while the deviation exceeds the second calibration threshold, the second predetermined value corresponding to the shaped torque request when the deviation initially exceeds the second calibration threshold;
tracking, at the control module, the true reference torque to the shaped torque request while the deviation does not exceed the second calibration threshold;
calculating, at the control module, a true driver intent as a difference between the driver torque target and the true reference torque;
referencing, at the control module, a library of calibration tables with the true driver intent and returning a torque acceleration request, the library of calibration tables relating changes in torque to rates of change in torque;
determining, at the control module, the shaped torque request based upon the driver torque target limited by the torque acceleration request; and
controlling, by the control module, at least one actuator for controlling an axle torque based upon the shaped torque request.

20. The method of claim 19, wherein the library of calibration tables is delimited by a driving mode.

* * * * *